(No Model.) 3 Sheets—Sheet 1.
H. CARMONT.
WHEEL TIRE.
No. 557,050. Patented Mar. 24, 1896.
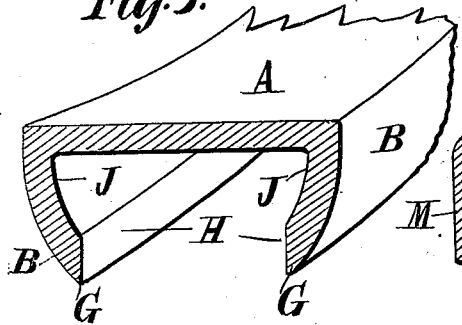
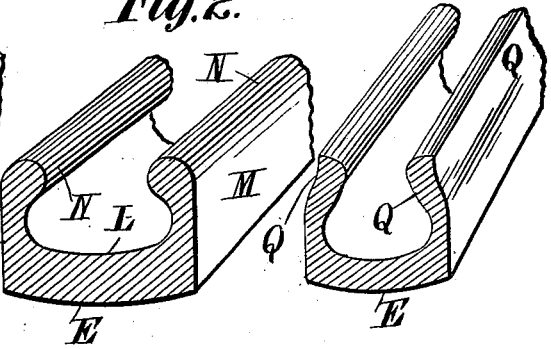
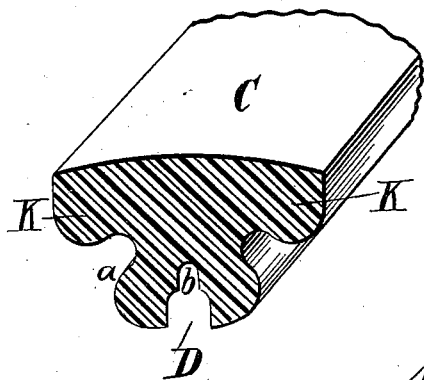
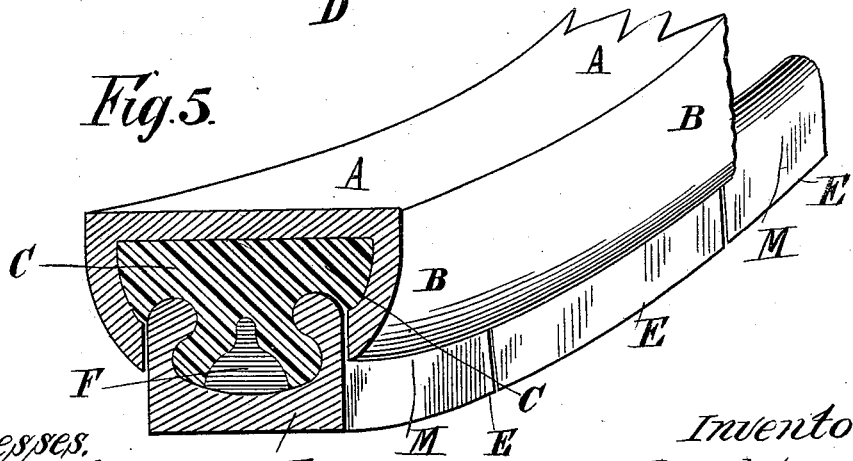
Witnesses.
Thos. A. Gunn
Robert Emmett
Inventor.
Hazelwood Carmont.
By James L. Norris.
Atty.
ANDREW B. GRAHAM, PHOTO-LITHO, WASHINGTON, D.C.

(No Model.) H. CARMONT. 3 Sheets—Sheet 2.
WHEEL TIRE.
No. 557,050. Patented Mar. 24, 1896.
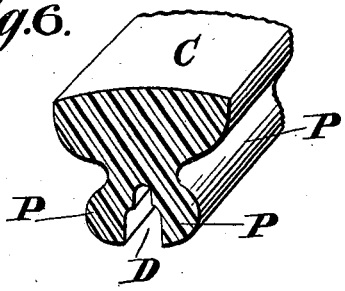
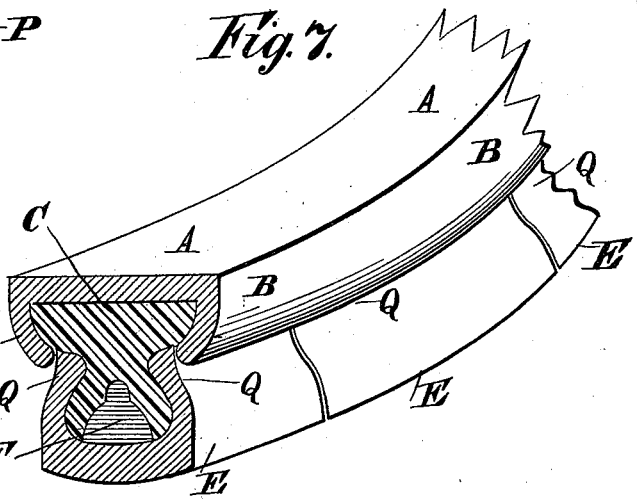
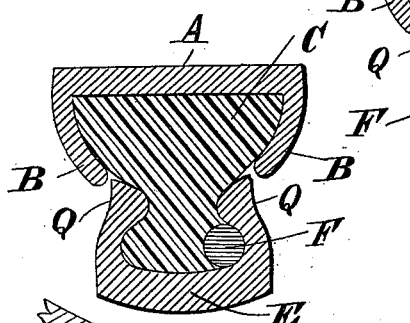
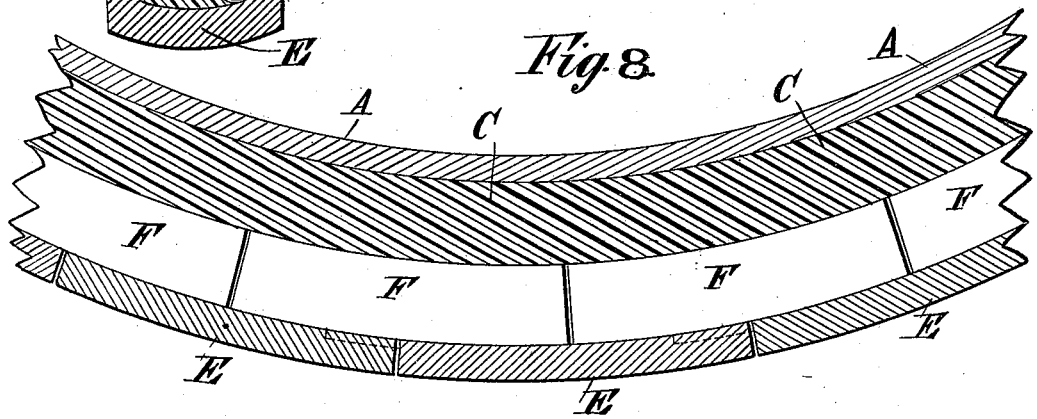
Witnesses,
Inventor.
Hazelwood Carmont.
By James L. Norris,
Atty.

(No Model.) 3 Sheets—Sheet 3.
H. CARMONT.
WHEEL TIRE.
No. 557,050. Patented Mar. 24, 1896.
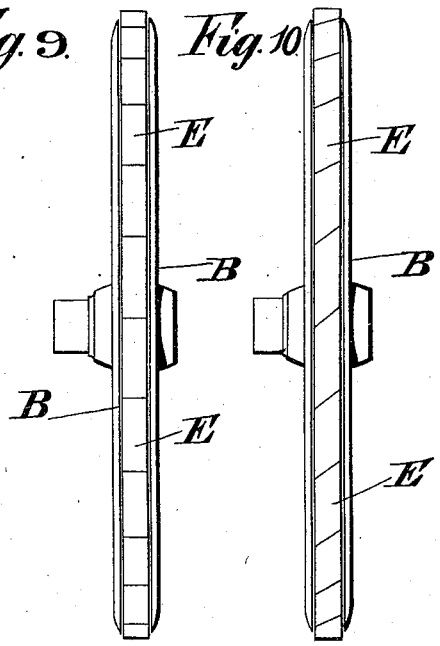
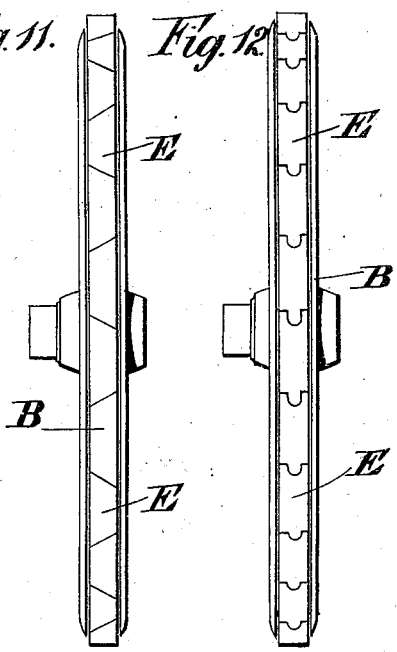
Witnesses.
Thos. A. Green
Robert Emmett
Inventor.
Hazelwood Carmont.
By James L. Norris.
Atty.

UNITED STATES PATENT OFFICE.

HAZELWOOD CARMONT, OF KINGSTON-UPON-THAMES, ENGLAND.

WHEEL-TIRE.

SPECIFICATION forming part of Letters Patent No. 557,050, dated March 24, 1896.

Application filed November 4, 1895. Serial No. 567,921. (No model.) Patented in England October 26, 1894, No. 20,537.

*To all whom it may concern:*

Be it known that I, HAZELWOOD CARMONT, a subject of the Queen of Great Britain, and a resident of Helmsdale, Kingston-upon-Thames, county of Surrey, England, have invented a certain new and useful Improvement Connected with Wheel-Tires, (patented in Great Britain, No. 20,537, dated October 26, 1894,) of which the following is a specification.

The object of this invention is to provide a new and improved wheel-tire, whereby the jump or bump of the wheel while running over stones and other irregular choppy roadways is absorbed by the tire itself instead of being felt through the wheel to the vehicle, as at present. Again, metal-tired rubber-liner rims in running over the stones drop into hollows and impart a shaking sensation to the whole of the vehicle.

By my invention the many inconveniences of combined rubber and metal tires are reduced to a minimum and in most cases entirely prevented.

For the purpose of my invention, and as I show in the annexed drawings, I employ a gutter-shaped iron rim A, the flange edges B B extending or curved inwardly to grip the sides of a rubber liner C placed or squeezed therein.

The projecting portion of the rubber has a channel D, and after each section of an outer tire E is put or forced on a key F is driven in to secure the parts permanently together by wedging the projecting part of the rubber liner against the surfaces of the tire or tread sections E.

By this invention only that part of the wheel's circumference in touch with the ground is under compression, consequently the section next thereto, as the wheel rotates, is projecting beyond and comes into touch with the ground in a gradual and silent manner and becomes compressed in succession, and so on as each section is brought to bear.

Figure 1 is a sectional elevation of a rim; Fig. 2, a perspective elevation of a tire-section. These rims and tire-sections are specially adapted for heavy vehicles, such as omnibuses, vans and trade carts, which bear comparatively heavy loads. Fig. 3 is a perspective elevation of a tire-section suitable for light-running vehicles; Fig. 4, a sectional elevation of special shape or contour of rubber liner channeled on the outer face and adapted for the rim and tire sections shown at Figs. 1 and 2, also seen in position in Fig. 5; Fig. 6, a sectional elevation of special shape or form of rubber channeled outer face liner for light-running vehicles; Fig. 7, a sectional elevation of rim-sections and rubber liner for light-running vehicles. Fig. 7$^a$ is a modified form; Fig. 8, a longitudinal or circumferential section of rim, channeled outer face rubber liner and tread-sections of the kind represented by Figs. 1, 2, 4 and 5. Figs. 9, 10, 11 and 12 indicate wheels with tire-section of different forms, Fig. 9 being direct transverse, Fig. 10, diagonal tire-section ends, all looking in the same direction; Fig. 11, diagonal ends reversed, and Fig. 12 part transverse and part recessed and bulged at opposite ends to key into each other and constituting an articulated tire.

According to Figs. 1 and 5 it may be observed that the depending or side walls, B B, of the gutter-shaped rim A are curved inwardly, with deep-nosed edges G G, with flat inner faces, H H, and projecting toward each other to form hollows J J in the upper inner portions and constituting locks for retaining the ribs K K of the rubber liner in position when forced into the space between the side walls, B B.

The tire-sections, Fig. 2, have a rounded inner face, L, and the outer faces of the walls M M are vertically flat, with inner projecting ribs, N N, for the location of the bellied portions P P of the rubber liner C as each tire-section is forced over said bellied portions, this being effectively performed by first closing the ribs P P upon the channel D, the texture of the rubber liner insuring the return of the ribs P P to occupy their positions under the ribs N N, the rubber ribs P P and the hollow of the tire-sections corresponding for the purpose.

The purport of the foregoing arrangement of the noses G G and of the flat faces H H with the flat vertical outer sides of the walls M M of the tire-sections E is: side splay motion is obviated when the sections strike a stone from the side, or when the tire-sections become canted while the wheel is traveling over a portion of a road set at an angle to the curb, or when the tire-sections' treads are not centrally in touch with the roadway, the tire-sections having free up-and-down motion within the walls H H of the rim A, but a limited side or canting motion by the touch of the metal surfaces H H and M M. This arrangement prevents the rubber liner being strained or torn along its weakest part—viz., from $a$ to $b$. The rubber is also completely inclosed and is constrained to vertical pressure only, a feature of the highest possible importance to rubber-lined tires of road vehicles for maintaining the efficiency of a wheel subjected to varying weights of loads and the rough treatment imparted by the unevenness of the surface over which they move.

The tire-sections E E are locked to the rubber liner C by keys F, which are shaped to correspond with that of the channel D, but of slightly larger dimensions, so that when driven in from the end of each tire-section E they compress the rubber and squeeze the ribs P P into very close contact with hollows of the side walls, M M. Each key F is driven into break joint with the tire-sections, as indicated at Fig. 8, or be driven to correspond at the ends.

The keys F F are shown of a shape corresponding to that of the channel in the outer face of the rubber liner C, and they are slightly larger for compressing the rubber equally at all the touching parts on the walls of the channel for actual binding location of one to the other, so that when driven in they become fixed and immovable during the oscillations, jumping, jolting or other motions imparted to the wheel while traveling.

In the view, Fig. 7, for light-vehicle tires the outer upper part of the side walls of the sections E E are curved inwardly, as at Q Q, to lodge just inside the noses of the flanges B B of the rim A, so that when compression of the rubber occurs the metal of the sections enter sufficiently to insure metallic contact when the sections E E are canted by uneven state of the road over which a wheel may be traveling. The tread of the sections of this kind of tire is rounded to centralize the bearing and is of sufficient width to ride on the metals of a tram-line without entering the groove.

The keys may be of a shape other than shown, as well as the design of the space in the rubber liner, and in some cases they, as strips or otherwise, can be affixed in the curving or vulcanizing process to the rubber liner as to be part and parcel of same.

The ends of the tire-sections may be plain or be tongued and grooved, as indicated by the dotted lines R R in Fig. 8, so that each section would have an end bearing on its adjoining section to prevent any tendency to cant in its length.

Fig. 7ª represents the key F forced into a channel in the side of the rubber liner C; but each side of the rubber liner C may have a channel into which keys can be forced, the rubber liner C being so shaped that its upper and lower edges are squeezed into any crevices that might be formed from a slight difference of fit between that of the keys F and of the tire-sections E.

What I claim, and desire to secure by Letters Patent, is—

1. The combination in a wheel-tire, of a gutter-shaped rim having inwardly-extended side flanges, a rubber liner fitted into the rim and having a channeled, projecting portion, a plurality of outer gutter-shaped tread-sections inclosing the channeled portion of the liner, and keys driven into the channeled portion of the liner to secure the tread-sections thereupon, substantially as described.

2. The combination in a wheel-tire, of a rim, a rubber liner fitted into the rim and having a projecting portion, tread-sections inclosing the projecting portions of the liner, and keys for wedging the liner in the tread-sections, substantially as described.

3. The construction of wheel-tires from a combination of gutter-shaped rim A with incurved depending flanges B, a shaped rubber liner C having a channel in outer face D gutter-shaped sections E with straight vertical walls M, M, having inwardly-curved noses and keys F driven into the shaped space of the rubber liner C, the flanges of the section E, treads engaging within the noses of the rim-flanges B as described with reference to Fig. 5 of the annexed drawings.

In witness whereof I have hereto signed my name, in the presence of two subscribing witnesses, this 11th day of October, 1895.

HAZELWOOD CARMONT.

Witnesses:
HENRY GARDNER,
RICHARD CORE GARDNER.